Nov. 2, 1943.   E. W. HENDERSON   2,333,313
APPARATUS FOR TESTING THE STRENGTH OF EGGSHELLS
Filed July 15, 1942

INVENTOR
Earl W. Henderson.
BY
Carroll R. Taber

Patented Nov. 2, 1943

2,333,313

UNITED STATES PATENT OFFICE 2,333,313

APPARATUS FOR TESTING THE STRENGTH OF EGGSHELLS

Earl W. Henderson, East Lansing, Mich., assignor to Michigan State Board of Agriculture, East Lansing, Mich., a corporation of Michigan Application July 15, 1942, Serial No. 450,960

4 Claims. (Cl. 265—12)

This invention relates to apparatus for measuring the strength of eggshells.

Egg shells vary greatly in strength. The weaker shells are frequently broken in handling and thereby become substantially worthless. The principal object of this invention is to provide a method and means for determining the relative strength of an egg shell without actually breaking it. This object is attained by applying to the egg shell a predetermined pressure less than the breaking pressure and measuring the deflection of the shell under the pressure.

I have discovered that there is a relation between the strength of the shell and the amount of its deflection under pressure. That is, a relatively great deflection is indicative of a weak shell, whereas a relatively small deflection is indicative of a strong shell.

The pressure to be applied is initially determined by applying successively greater pressures to a typical lot of eggs so as to find the breaking pressure thereof. Thereafter a pressure is employed for testing additional egg shells which is less than that required for breaking the shells. The amount of deflection of the egg shell is measured and indicates its relative strength.

While the pressure may be applied in any desired form, I prefer to create the pressure by placing a unit weight upon the shell. A simple form of apparatus for applying the pressure of a weight to an egg shell and for measuring the deflection of the shell under pressure of the weight is shown in the accompanying drawing, wherein.

Figure 1:
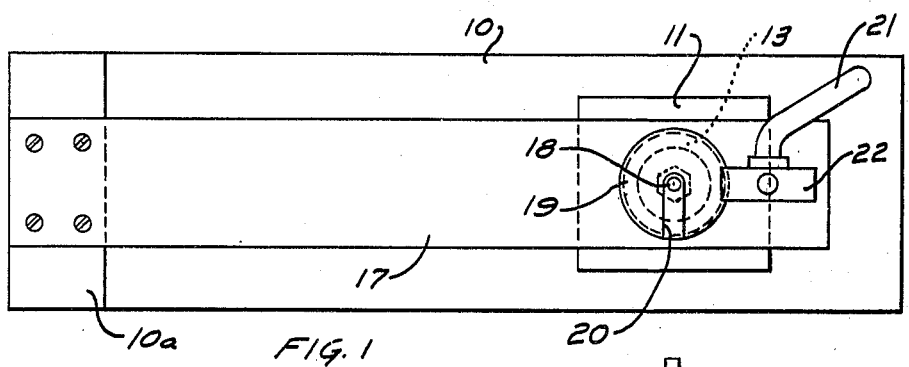
Figure 1 is a plan view of a device embodying the invention.
Figure 2:
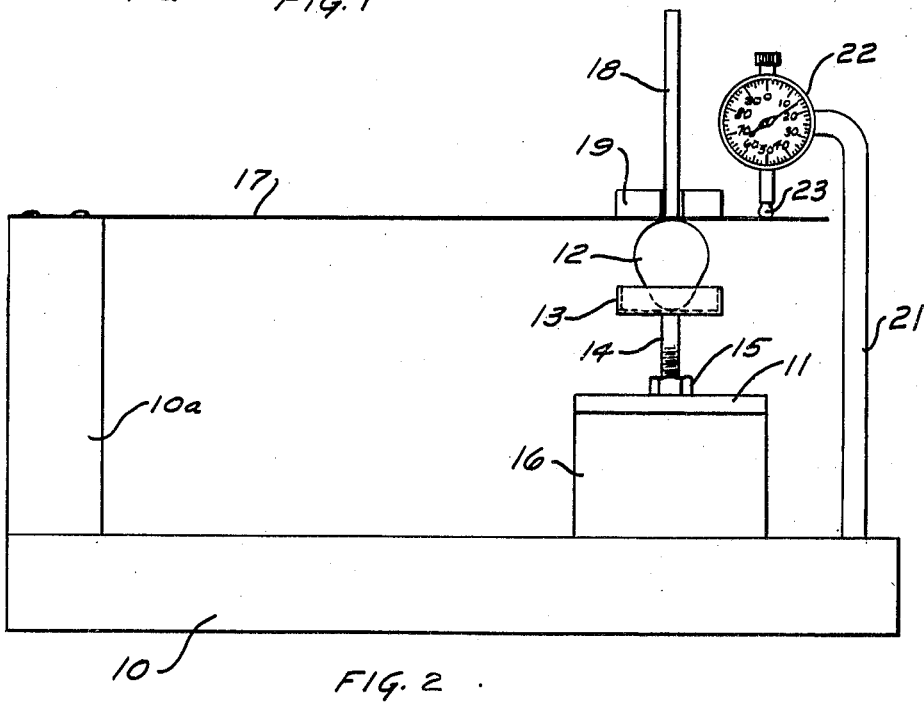
Figure 2 is a front elevational view of the same.

The device shown in the drawing comprises a base 10 which may be a flat board of suitable size. Mounted on the base 10 near one end thereof is a fixed support for an egg 12 to be tested. The support comprises a cup 13 of cylindrical form secured to a threaded rod 14. The latter is threaded into a nut 15 welded to a plate 11 which may be mounted on a suitable pedestal 16 on the base. The rod 14 is threaded into the nut 15 to provide for limited vertical adjustment of the cup 13.

Rigidly secured at one end to an upright extension 10a of the base is a thin, extremely flexible metal beam 17. The beam overlies the cup 13 and is normally spaced therefrom so as to permit the placing of an egg between the cup and the beam. An upright rod 18 is welded or otherwise secured to the beam 17 directly over the center of the cup 13. The rod is employed to position one or more standard weights 19 on top of the beam directly over the cup 13. The weights are preferably cylindrical and are slotted at 21 to permit ready placement or removal thereof.

The beam 17 is of such length and is so arranged with respect to the cup 13 that the beam normally engages the upper surface of the egg 12 when the egg is placed upon the cup 13 without the egg producing any substantial upward deflection of the beam and without the beam exerting any substantial pressure on the egg. The cup 13 is adjustable vertically so that this relation of the parts can be obtained regardless of the size of the egg being tested. Thus, the cup 13 constitutes a fixed support and the beam 17 a freely movable support, which are spaced from each other to receive an egg therebetween.

A standard 21 fixed to the base carries a gauge 22 above the free end of the beam 17. Preferably the gauge 22 is a dial type micrometer gauge. It is mounted so that the movable pin 23 thereof engages the top surface of the beam 17.

To determine the strength of an egg, it is inserted in the cup 13 and the height of the cup 13 adjusted so that the beam 17 contacts the upper end of the egg. The gauge is read with no load on the beam. A weight which will not crush the egg is placed on the beam over the egg and the deflection of the beam is measured by the new reading on the gauge 22. In this manner, the deflection of the egg shell, under the influence of the pressure exerted by the weight, is measured.

By progressively adding weights until fracture of the shell occurs, the ultimate strength of the egg can be obtained if desired. Following the same procedure with a number of eggs of varying strengths will provide data that can be charted. With the data thus procured it is possible to accurately determine the relative strength of any egg shell without breaking it. All that is necessary is to measure the deflection caused by one or more weights insufficient to cause fracture of the shell and determine from the chart the relative strength of that particular shell.

From the foregoing it will be apparent that the present invention provides a simple, convenient and accurate apparatus for testing the strength of egg shells. The use of the invention permits the segregation of eggs with strong shells that require no special treatment from those having relatively weak shells which do require special care in handling, etc. It also makes possible the selection of the stronger shells for incubation purposes and an ultimate increase in the strength of the shells produced by the offspring.

The scope of the invention is indicated in the appended claims.

1. Apparatus for testing the compressive strength of materials comprising a base, a support for the material to be tested mounted on said base, a relatively long extremely flexible horizontal beam rigidly connected at one end only to said base at a point remote from said support, said beam overlying said support in spaced relation thereto and having a free end movable vertically about its fixed end, said beam being adapted to carry weights of varying magnitude directly over said support, and a gauge mounted on said base and engaging the beam adjacent its free end for measuring the deflection of the beam.

2. Apparatus for testing the compressive strength of materials comprising a base, a fixed support on said base, and a freely movable support on said base arranged to receive the material to be tested therebetween, said freely movable support comprising a relatively long extremely flexible arm having a free end disposed over said fixed support and rigidly connected to said base at a point remote from said fixed support, means for applying a predetermined force to said movable support, and means for measuring the amount of deflection of said movable support caused by said predetermined force.

3. Apparatus as defined in claim 2 which also includes means for adjusting the fixed support to vary the normal distance between the two supports.

4. Apparatus for testing the compressive strength of materials comprising a base, a support for the material to be tested mounted on said base, a relatively long extremely flexible horizontal beam connected at one end only to said base at a point remote from said support, said beam overlying said support in spaced relation thereto and having a free end movable vertically about its fixed end, said beam being adapted to carry weights of varying magnitude directly over said support, and a gauge mounted on said base and engaging the beam adjacent its free end for measuring the deflection of the beam.

EARL W. HENDERSON.